US012762453B2

(12) United States Patent
Coady et al.

(10) Patent No.: US 12,762,453 B2
(45) Date of Patent: Oct. 13, 2026

(54) OPTIMIZING EXECUTION OF QUANTUM SERVICE DEFINITION FILES USING A QUANTUM OPTIMIZATION DATABASE

(71) Applicant: Red Hat, Inc., Raleigh, NC (US)

(72) Inventors: Stephen Coady, Waterford (IE); Leigh Griffin, Waterford (IE)

(73) Assignee: Red Hat, LLC, Raleigh, NC (US)

( * ) Notice: Subject to any disclaimer, the term of this patent is extended or adjusted under 35 U.S.C. 154(b) by 1202 days.

(21) Appl. No.: 17/717,713

(22) Filed: Apr. 11, 2022

(65) Prior Publication Data

US 2023/0325703 A1 Oct. 12, 2023

(51) Int. Cl.
*G06N 10/60* (2022.01)
*G06N 10/40* (2022.01)

(52) U.S. Cl.
CPC ............. *G06N 10/60* (2022.01); *G06N 10/40* (2022.01)

(58) Field of Classification Search
CPC ........ G06N 10/60; G06N 10/40; G06N 10/20; G06N 10/80; G06N 10/10; G06N 10/70
See application file for complete search history.

(56) References Cited

U.S. PATENT DOCUMENTS 9,563,409 B2 * 2/2017 Kim .................... G06F 16/3349
10,977,570 B2 * 4/2021 Smith ................... G06F 9/3877
11,494,681 B1 * 11/2022 Peterson ................ G06N 10/80
11,797,276 B1 * 10/2023 Shi ......................... G06N 10/00
11,977,957 B2 * 5/2024 Shanmugam Sakthivadivel ......... G06F 8/54
2007/0245323 A1 * 10/2007 Bertelrud .................. G06F 8/71 717/140
2012/0233597 A1 * 9/2012 Ogasawara ............... G06F 8/36 717/124
2018/0308000 A1 * 10/2018 Dukatz .................. G06N 10/60
2019/0042392 A1 2/2019 Matsuura et al.
2020/0074346 A1 3/2020 Griffin et al.
2020/0116784 A1 4/2020 Liu et al.
2020/0117764 A1 4/2020 Zuccarelli et al.
2020/0125402 A1 * 4/2020 Griffin ................... G06N 10/60
(Continued)

OTHER PUBLICATIONS

Savchuk, M. M., and A. V. Fesenko. "Quantum computing: Survey and analysis." Cybernetics and Systems Analysis 55 (2019): 10-21. (Year: 2019).*
(Continued)

*Primary Examiner* — Tan H Tran
*Assistant Examiner* — Blaine T Basom
(74) *Attorney, Agent, or Firm* — Dority & Manning, P.A.

(57) ABSTRACT

Optimizing execution of quantum service definition files using a quantum optimization database is disclosed herein. In one example, a processor device of a computing device identifies a first one or more instructions within a quantum service definition file of a quantum service. The processor device next determines that the first one or more instructions correspond to a first entry in a quantum optimization database, the first entry comprising a result of a previous execution of the first one or more instructions. In response to determining that the first one or more instructions correspond to the first entry in the quantum optimization database, the processor device then modifies the quantum service definition file to incorporate the result of the previous execution of the first one or more instructions in place of the first one or more instructions.

17 Claims, 9 Drawing Sheets

(56) References Cited

U.S. PATENT DOCUMENTS

| | | | | |
|---|---|---|---|---|
| 2020/0167278 | A1* | 5/2020 | Gunnels | G06F 12/0215 |
| 2020/0183814 | A1* | 6/2020 | Liu | G06N 10/80 |
| 2020/0380084 | A1 | 12/2020 | Gambetta et al. | |
| 2021/0334081 | A1 | 10/2021 | Chong et al. | |
| 2022/0342696 | A1* | 10/2022 | Gershgorn | G06F 9/52 |

OTHER PUBLICATIONS

Huang, Y. et al., "Statistical Assertions for Validating Patterns and Finding Bugs in Quantum Programs," Proceedings of the 46th International Symposium on Computer Architecture (ISCA'19), Jun. 2019, Association for Computing Machinery, pp. 541-553.

Wille, R. et al., "JKQ: JKU Tools for Quantum Computing," 2020 IEEE/ACM International Conference on Computer Aided Design (ICCAD), Nov. 2-5, 2020, San Diego, CA, USA, IEEE, 5 pages.

* cited by examiner

OPTIMIZING EXECUTION OF QUANTUM SERVICE DEFINITION FILES USING A QUANTUM OPTIMIZATION DATABASE

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices to provide desired functionality. As quantum computing continues to increase in popularity and become more commonplace, functionality for optimizing the execution of quantum services will be desirable.

SUMMARY

The examples disclosed herein optimize execution of quantum service definition files using a quantum optimization database. In one example, an optimization service, executing on a classical computing device or a quantum computing device, provides a mechanism for populating a quantum optimization database with the results of executing sets of one or more instructions of a quantum service definition file for a quantum service. During subsequent execution of the quantum service using the quantum service definition file, the quantum optimization database may supply the execution results corresponding to the one or more instructions for incorporation into the quantum service definition file in place of the one or more instructions, thereby avoiding the need to execute the one or more instructions.

In another example, a method for optimizing execution of quantum service definition files using a quantum optimization database is disclosed. The method comprises identifying, by a processor device of a computing device, a first one or more instructions within a quantum service definition file of a quantum service. The method further comprises determining that the first one or more instructions correspond to a first entry in a quantum optimization database, the first entry comprising a result of a previous execution of the first one or more instructions. The method also comprises, responsive to determining that the first one or more instructions correspond to the first entry in the quantum optimization database, modifying the quantum service definition file to incorporate the result of the previous execution of the first one or more instructions in place of the first one or more instructions.

In another example, a computing device for optimizing execution of quantum service definition files using a quantum optimization database is disclosed. The computing device comprises a system memory, and a processor device communicatively coupled to the system memory. The processor device is to identify a first one or more instructions within a quantum service definition file of a quantum service. The processor device is further to determine that the first one or more instructions correspond to a first entry in a quantum optimization database, the first entry comprising a result of a previous execution of the first one or more instructions. The processor device is also to, responsive to determining that the first one or more instructions correspond to the first entry in the quantum optimization database, modify the quantum service definition file to incorporate the result of the previous execution of the first one or more instructions in place of the first one or more instructions.

In another example, a non-transitory computer-readable medium for optimizing execution of quantum service definition files using a quantum optimization database is disclosed. The non-transitory computer-readable medium stores thereon computer-executable instructions that, when executed, cause one or more processor devices of a computing device to identify a first one or more instructions within a quantum service definition file of a quantum service. The computer-executable instructions further cause the one or more processor devices to determine that the first one or more instructions correspond to a first entry in a quantum optimization database, the first entry comprising a result of a previous execution of the first one or more instructions. The computer-executable instructions also cause the one or more processor devices to, responsive to determining that the first one or more instructions correspond to the first entry in the quantum optimization database, modify the quantum service definition file to incorporate the result of the previous execution of the first one or more instructions in place of the first one or more instructions.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
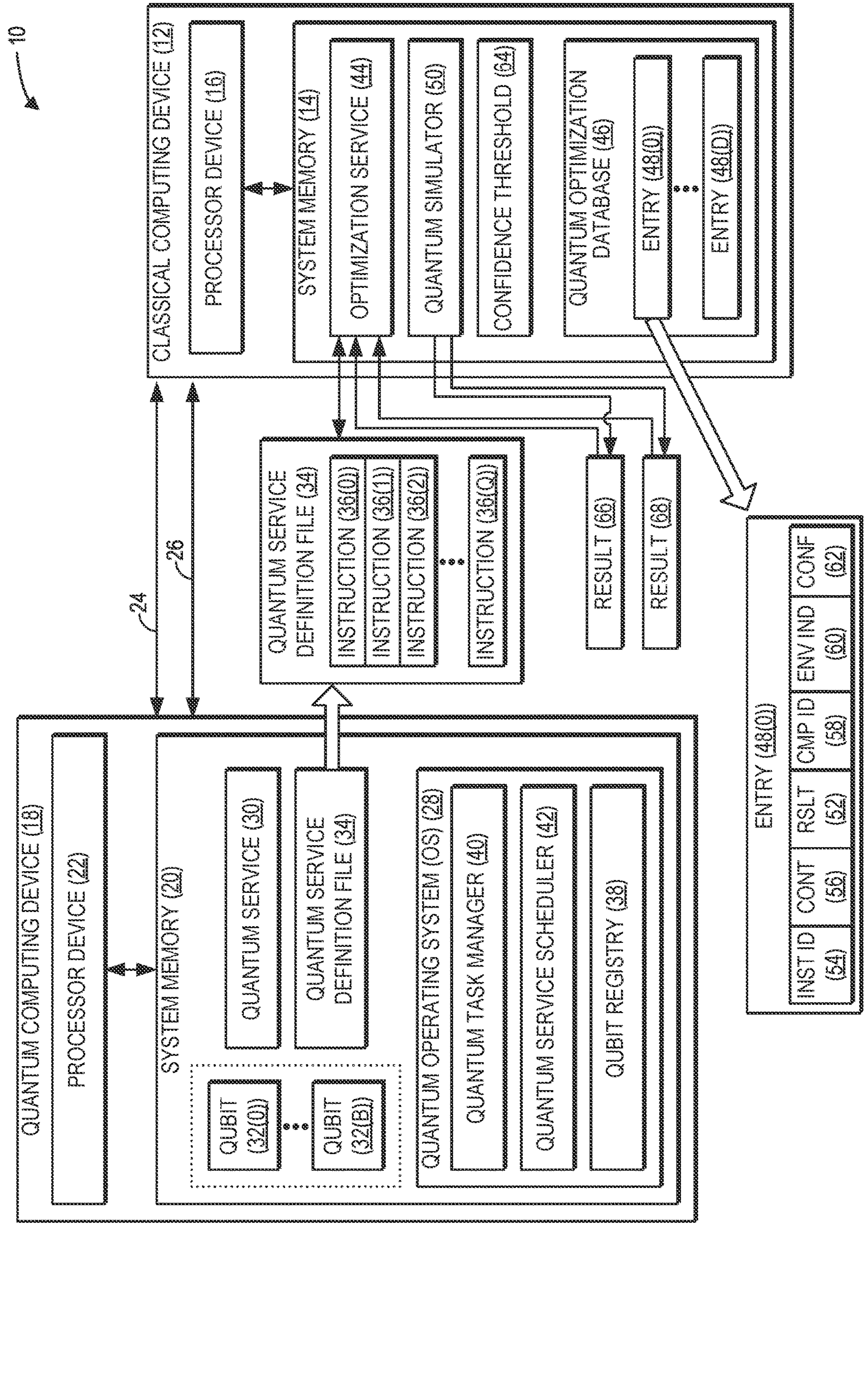
FIG. 1 is a block diagram of a computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as “first one or more instructions” and “second one or more instructions,” and does not imply a priority, a type, an importance, or other attribute, unless otherwise stated herein. The term “about” used herein in conjunction with a numeric value means any value that is within a range of ten percent greater than or ten percent less than the numeric value. As used herein and in the claims, the articles “a” and “an” in reference to an element refers to “one or more” of the element unless otherwise explicitly specified. The word “or” as used herein and in the claims is inclusive unless contextually impossible. As an example, the recitation of A or B means A, or B, or both A and B.

Quantum computing involves the use of quantum bits, referred to herein as “qubits,” each of which has properties (such as superposition and entanglement) that differ from those of classical (i.e., non-quantum) bits used in classical computing. Qubits may be employed by quantum services that are executed by quantum computing devices to provide desired functionality. The process for instantiating qubits, placing them into specific quantum states and relationships, storing values using the qubits, and/or subsequently deallocating and reusing the qubits may require multiple qubits as well as the execution of multiple instruction sequences. The ability to execute quantum services thus may be limited by factors such as the availability of quantum resources such as qubits, the availability of processing resources, the environmental conditions in which the quantum computing device operates, and the like. As quantum computing continues to increase in popularity and become more commonplace, functionality for optimizing the execution of quantum service definition files to mitigate the effects of these and other factors will be desirable.

In this regard, examples disclosed herein implement an optimization service for optimizing execution of quantum service definition files using a quantum optimization database. The optimization service is executed by a processor device of a computing device and provides a mechanism for substituting sets of one or more instructions within a quantum service definition file of a quantum service (e.g., a Quantum Assembly (QASM) file, as a non-limiting example) with results generated by a previous execution of those sets of one or more or more instructions. As discussed in greater detail below, the optimization service may be executed by a classical computing device in conjunction with a quantum simulator (e.g., the Qiskit quantum computing framework, as a non-limiting example), by a quantum computing device executing a quantum service, or by a combination thereof. For instance, a classical computing device may execute an instance of the optimization service to populate the quantum optimization database with entries for a quantum service definition file of a quantum service, and a quantum computing device may subsequently execute another instance of the optimization service prior to or during execution of the quantum service. The operations discussed below may be performed in some examples as a pre-execution optimization step for the quantum service definition file or may be performed during execution of the quantum service.

In exemplary operation, the optimization service identifies one or more instructions within a quantum service definition file of a quantum service. The one or more instructions may comprise a single instruction or may comprise multiple instructions that together accomplish a particular task, such as configuring a qubit. The one or more instructions may be identified based on formatting of the instructions within the quantum service definition file, and/or based on rules applied by the optimization service.

The optimization service then determines whether the one or more instructions correspond to an entry in a quantum optimization database, where the entry stores a result of a previous execution of the one or more instructions. The result stored by the entry may comprise, e.g., a data value resulting from a calculation, a quantum state of a qubit, and/or a value stored by a qubit, as non-limiting examples. If the one or more instructions are determined to correspond to an entry in the quantum optimization database, the optimization service modifies the quantum service definition file to incorporate the result of the previous execution of the one or more instructions in place of the one or more instructions. For instance, the optimization service may modify the quantum service definition file to remove the one or more instructions from the quantum service definition file and add a new instruction that directly provides the result of the previous execution of the one or more instructions.

In some examples, the entry may comprise an instruction identifier of the one or more instructions (e.g., one or more line numbers of the one or more instructions, a hash value generated based on the content of the one or more instructions, and/or the like, as non-limiting examples) and the contents of the one or more instructions. The one or more instructions may then be determined to correspond to the entry based the instruction identifier and/or on the contents of the one or more instructions. Some examples may provide that the entry further comprises a computing device identifier of a computing device on which the previous execution of the one or more instructions was performed. In such examples, the operations for determining that the one or more instructions correspond to the entry may include determining that the computing device identifier corresponds to the computing device executing the optimization service. Similarly, the entry in some examples may include an environmental condition indication that represents an environmental condition (e.g., temperature, processor load, memory usage, noise levels, and/or the like, as non-limiting examples) under which the previous execution of the one or more instructions was performed. The operations for determining that the one or more instructions correspond to the entry thus may include determining that the environmental condition indication of the first entry corresponds to a current operating environmental condition of the processor device.

According to some examples, the entry may also include a confidence indicator that can be used to indicate a level of confidence in the result generated by the previous execution of the one or more instructions. In such examples, modifying the quantum service definition file to incorporate the result of the previous execution of the one or more instructions may be performed only if a value of the confidence indicator of the entry exceeds a confidence threshold. Otherwise, the optimization service may initiate execution of the one or more instructions, obtain a result of execution of the one or more instructions, and determine whether the result matches the result of the previous execution of the one or more instructions. If so, the optimization service may increment the value of the confidence indicator of the entry corresponding to the one or more instructions.

Some examples may provide that, if the optimization service determines that no entry in the quantum optimization database corresponds to the one or more instructions, the optimization service may initiate execution of the one or more instructions and obtain a result of execution of the one or more instructions. The optimization service may then generate an entry in the quantum optimization database corresponding to the one or more instructions. The entry may comprise an instruction identifier of the one or more instructions, a content of the one or more instructions, and the result of execution of the one or more instructions. In some examples, the entry may further comprise a computing device identifier of the computing device, an environmental condition indication indicating an environmental condition under which the execution of the one or more instructions was performed, and/or a confidence indicator, as non-limiting examples.

FIG. 1 is a block diagram of a computing system 10 according to one example. The computing system 10 includes a classical computing device 12 that comprises a system memory 14 and a processor device 16. The computing system 10 further includes a quantum computing device 18 that comprises a system memory 20 and a processor device 22. The classical computing device 12 and the quantum computing device 18 in the example of FIG. 1 are communicatively coupled via a classical communications link 24, which may comprise a private network or a public network such as the internet. The classical computing device 12 and the quantum computing device 18 are also communicatively coupled to each other and/or to other quantum computing devices (not shown) via a quantum channel 26 over which qubits may be transmitted. It is to be understood that the computing system 10, according to some examples, may include more or fewer quantum computing devices and/or classical computing devices than illustrated in FIG. 1. Additionally, the classical computing device 12 and/or the quantum computing device 18 in some examples may include constituent elements in addition to those illustrated in FIG. 1.

The quantum computing device 18 in FIG. 1 operates in quantum environments but is capable of operating using classical computing principles or quantum computing principles. When using quantum computing principles, the quantum computing device 18 performs computations that utilize quantum-mechanical phenomena, such as superposition and/or entanglement states. The quantum computing device 18 may operate under certain environmental conditions, such as at or near zero degrees (0°) Kelvin. When using classical computing principles, the quantum computing device 18 utilizes binary digits that have a value of either zero (0) or one (1).

In the example of FIG. 1, the quantum computing device 18 executes a quantum operating system (OS) 28 that provides functionality for managing execution of quantum services such as a quantum service 30. The quantum service 30 comprises a process that employs one or more qubits such as qubits 32(0)-32(B) to perform quantum operations. The quantum service 30 of FIG. 1 is defined by a quantum service definition file 34, which comprises a plurality of quantum programming instructions (referred to herein as "instructions" and captioned as "INSTRUCTION" in FIG. 1) 36(0)-36(Q) for allocating and manipulating qubits to achieve a desired functionality. The quantum service definition file 34 in some examples may comprise a QASM file, as a non-limiting example. Each of the qubits 32(0)-32(B) may be used by quantum services such as the quantum service 30 to store a data value (not shown), and/or may have a quantum state (not shown) (e.g., spin, as a non-limiting example) into which the qubit 32(0)-32(B) is programmatically placed.

To maintain information for qubits such as the qubits 32(0)-32(B), the quantum OS 28 provides a qubit registry 38, which comprises a plurality of qubit registry entries (not shown) that each correspond to a qubit. The qubit registry 38 maintains and provides access to data relating to the qubits implemented by the quantum computing device 18, including a count of the total number of qubits implemented by the quantum computing device 18, and a count of the number of available qubits that are currently available for allocation, as non-limiting examples. Each of the qubit registry entries of the qubit registry 38 also stores qubit metadata for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an entanglement indicator that indicates whether the corresponding qubit is in an entangled state. The functionality of the qubit registry 38 may be made accessible to other services and processes (e.g., via defined Application Programming Interfaces (APIs), as a non-limiting example).

Execution of quantum services such as the quantum service 30 is facilitated by a quantum task manager 40 and a quantum service scheduler 42, each of which operates in a manner analogous to their conventional classical counterparts. Thus, the quantum task manager 40 of the quantum OS 28 handles operations for creating, monitoring, and terminating quantum services. Likewise, the quantum service scheduler 42 of the quantum OS 28 controls the scheduling of quantum services for execution by the processor device 22 and the allocation of processing resources to executing quantum services. The functionality of the quantum task manager 40 and the quantum service scheduler 42 may be made accessible to other services and processes (e.g., via defined APIs, as a non-limiting example).

As quantum computing continues to increase in popularity and become more commonplace, functionality for optimizing the execution of quantum service definition files such as the quantum service definition file 34 will be desirable. In this regard, examples disclosed herein implement an optimization service 44 for optimizing execution of quantum service definition files using a quantum optimization database 46 comprising a plurality of entries 48(0)-48(D). The optimization service 44 accomplishes this by substituting sets of one or more of the instructions 36(0)-36(Q) within the quantum service definition file 34 of the quantum service 30 with results generated by a previous execution of the set of one or more of the instructions 36(0)-36(Q). The optimization service 44 in the example of FIG. 1 is executed by the classical computing device 12 in conjunction with a quantum simulator 50, which may comprise the Qiskit quantum computing framework, as a non-limiting example. Alternatively or additionally, the optimization service 44 according to some examples may be executed by the quantum computing device 18 executing the quantum service 30. Thus, for example, the classical computing device 12 may execute an instance of the optimization service 44 to populate the quantum optimization database 46, and the quantum computing device 18 may subsequently execute another instance of the optimization service 44 prior to or during execution of the quantum service 30. In some examples, the operations discussed herein may be performed as a pre-execution optimization step for the quantum service definition file 34, or may be performed during execution of the quantum service 30 by modifying the quantum service definition file 34 "in-flight."

In exemplary operation, the optimization service 44 identifies one or more instructions within the quantum service definition file 34 of the quantum service 30. The one or more instructions may comprise a single instruction or may comprise multiple instructions that together accomplish a particular task. For example, some tasks involved with allocating and configuring qubits may require multiple instructions among the instructions 36(0)-36(Q), which may be processed together as a group by the optimization service 44. Multiple instructions among the instructions 36(0)-36(Q) may be identified as instructions to be processed together based on formatting of the instructions 36(0)-36(Q) within the quantum service definition file 34, and/or based on rules (not shown) applied by the optimization service 44 during processing. In the example of FIG. 1, it is assumed for the sake of illustration that the optimization service 44 identifies the instruction 36(0) as the one or more instructions, and thus the instruction 36(0) is referred to herein as the "one or more instructions 36(0)."

The optimization service 44 next determines whether the one or more instructions 36(0) corresponds to one of the entries 48(0)-48(D) in the quantum optimization database 46. Each of the entries 48(0)-48(D) corresponds to one or more of the instructions 36(0)-36(Q) and stores a result of a previous execution of the corresponding one or more instructions 36(0)-36(Q). In the example of FIG. 1, the one or more instructions 36(0) correspond to the entry 48(0), which stores a result (captioned as "RSLT" in FIG. 1) 52 of a previous execution of the one or more instructions 36(0). The result 52 stored by the entry may comprise, e.g., a data value resulting from a calculation, a quantum state of a qubit, and/or a value stored by a qubit, as non-limiting examples.

The entry 48(0) in the example of FIG. 1 also stores additional information related to the one or more instructions 36(0). The entry 48(0) stores an instruction identifier (captioned as "INST ID" in FIG. 1) 54 that uniquely identifies the one or more instructions 36(0) corresponding to the entry 48(0). The instruction identifier 54 may comprise one or more line numbers of the one or more instructions 36(0) and/or a hash value generated based on the content of the one or more instructions 36(0), as non-limiting examples. The entry 48(0) also stores the actual content (captioned as "CONT" in FIG. 1) 56 of the one or more instructions 36(0), and stores a computing device identifier (captioned as "CMP ID" in FIG. 1) 58 that identifies a computing device on which the one or more instructions 36(0) were executed to generate the result 52.

The entry 48(0) further stores an environmental condition indication (captioned as "ENV IND" in FIG. 1) 60 that represents an environmental condition under which the previous execution of the one or more instructions 36(0) was performed. Thus, the environmental condition indication 60 may comprise an indication of temperature, processor load, memory usage, and/or noise level, as non-limiting examples. The entry 48(0) additionally stores a confidence indicator (captioned as "CONF" in FIG. 1) 62 that can be used to indicate a level of confidence in the result 52 generated by the previous execution of the one or more instructions 36(0). It is to be understood that, although not illustrated in FIG. 1, each of the entries 48(0)-48(D) includes fields corresponding to the result 52, the instruction identifier 54, the content 56, the computing device identifier 58, the environmental condition indication 60, and the confidence indicator 62 of the entry 48(0).

In some examples, the optimization service 44 may determine that the one or more instructions 36(0) correspond to the entry 48(0) by determining that the instruction identifier 54 of the entry 48(0) identifies the one or more instructions 36(0), and/or that the content 56 of the entry 48(0) matches the one or more instructions 36(0). Some examples may provide that the operations for determining that the one or more instructions 36(0) correspond to the entry 48(0) may include determining that the computing device identifier 58 corresponds to the computing device executing the optimization service 44 (e.g., the classical computing device 12, in the example of FIG. 1). The optimization service 44 according to some examples may determine that the one or more instructions 36(0) correspond to the entry 48(0) by determining that the environmental condition indication 60 of the entry 48(0) corresponds to a current operating environmental condition (i.e., a current temperature, a current processor load, a current memory usage, and/or a current noise level, as non-limiting examples) of the processor device 16 of the classical computing device 12.

If the optimization service 44 determines that the one or more instructions 36(0) correspond to an entry such as the entry 48(0) in the quantum optimization database 46, the optimization service 44 modifies the quantum service definition file 34 to incorporate the result 52 of the previous execution of the one or more instructions 36(0) in place of the one or more instructions 36(0) within the quantum service definition file 34. Thus, for example, the optimization service 44 may modify the quantum service definition file 34 to remove the one or more instructions 36(0) from the quantum service definition file 34, and add a new instruction (not shown) that directly provides the result 52 of the previous execution of the one or more instructions 36(0) (e.g., by setting a variable to store the result 52).

In some examples, the optimization service 44 may modify the quantum service definition file 34 to incorporate the result 52 of the previous execution of the one or more instructions 36(0) only if a value of the confidence indicator 62 of the entry 48(0) exceeds a confidence threshold 64. If the value of the confidence indicator 62 does not exceed the confidence threshold 64, the optimization service 44 may initiate execution of the one or more instructions 36(0). For instance, in examples in which the optimization service 44 is executed by the classical computing device 12, the optimization service 44 may access functionality of the quantum simulator 50 (e.g., via an API of the quantum simulator 50) to initiate execution the one or more instructions 36(0). In examples in which the optimization service 44 is executed by the quantum computing device 18, the optimization service 44 may access functionality of the quantum OS 28 or elements thereof to initiate execution of the one or more instruction 36(0). The optimization service 44 then obtains a result 66 of execution of the one or more instructions 36(0) and determines whether the result 66 matches the result 52 of the previous execution of the one or more instructions 36(0). If so, the optimization service 44 increments the value of the confidence indicator 62 of the entry 48(0) corresponding to the one or more instructions 36(0).

According to some examples, if the optimization service 44 determines that none of the entries 48(0)-48(D) in the quantum optimization database 46 corresponds to the one or more instructions 36(0), the optimization service 44 may initiate execution of the one or more instructions 36(0) as described above and obtain a result 68 of execution of the one or more instructions 36(0). The optimization service may then generate an entry such as the entry 48(0) in the quantum optimization database 46 corresponding to the one or more instructions 36(0) and store the result 68 as the result 52 of the entry 48(0).

It is to be understood that, because the optimization service 44 is a component of the quantum computing device 18, functionality implemented by the optimization service 44 may be attributed to the computing system 10 generally. Moreover, in examples where the optimization service 44 comprises software instructions that program the processor device 16 to carry out functionality discussed herein, functionality implemented by the optimization service 44 may be attributed herein to the processor device 16. It is to be further understood that while, for purposes of illustration only, the optimization service 44 is depicted as a single component, the functionality implemented by the optimization service 44 may be implemented in any number of components, and the examples discussed herein are not limited to any particular number of components. Moreover, it is noted that while, for purposes of illustration and simplicity, the examples are illustrated as being implemented by a processor device set that includes a single processor device on a single computing device, in other environments, such as a distributed and/or clustered environment, the examples may be implemented on a computer system that includes a processor device set that includes a plurality of processor devices of a plurality of different computing devices, and functionality of the examples may be implemented on different processor devices of different computing devices. Thus, irrespective of the implementation, the examples may be implemented on a computer system that includes a processor device set made up of one or more processor devices of one or more computing devices.

Figure 2A:
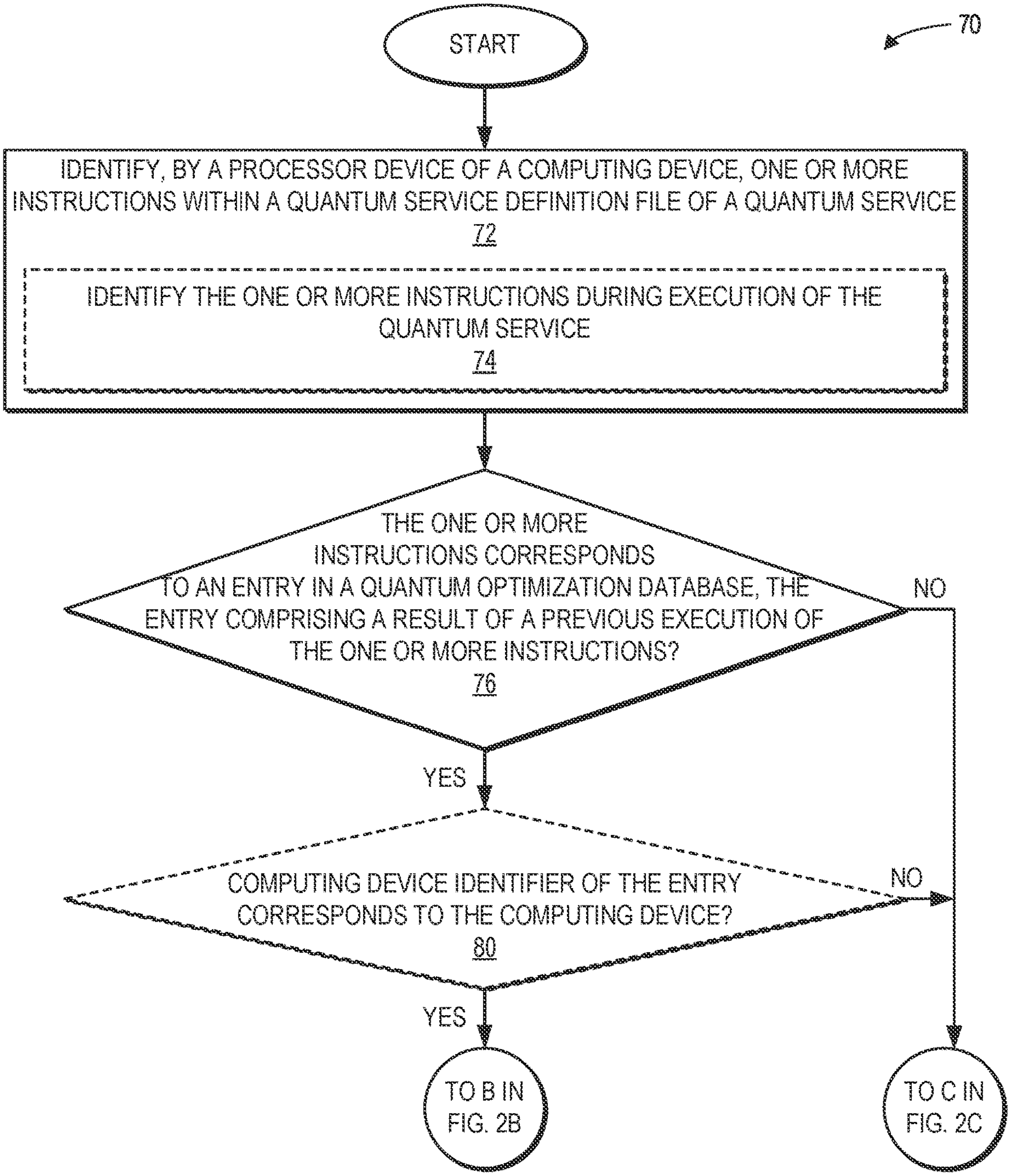
FIGS. 2A-2D are flowcharts illustrating operations performed by the computing system of FIG. 1 for optimizing execution of quantum service definition files using a quantum optimization database, according to one example.

FIGS. 2A-2D provide a flowchart 70 to illustrate exemplary operations performed by the computing system 10 of FIG. 1 for optimizing execution of quantum service definition files using a quantum optimization database according to one example. Elements of FIG. 1 are referenced in describing FIGS. 2A-2D for the sake of clarity. It is to be understood that, in some examples, some operations illustrated in FIGS. 2A-2D may be performed in an order other than illustrated herein, and/or may be omitted. In FIG. 2A, operations begin with a processor device, such as the processor device 16 of the classical computing device 12 of FIG. 1 (e.g., by executing the optimization service 44), identifying one or more instructions within a quantum service definition file of a quantum service (e.g., the one or more instructions 36(0) within the quantum service definition file 34 of the quantum service 30 of FIG. 1) (block 72). In some examples, the operations of block 72 for identifying the one or more instructions may comprise the optimization service 44 identifying the one or more instructions 36(0) during execution of the quantum service 30 (block 74).

The optimization service 44 next determines whether the one or more instructions 36(0) corresponds to an entry (e.g., the entry 48(0) of FIG. 1) in a quantum optimization database (e.g., the quantum optimization database 46 of FIG. 1), the entry 48(0) comprising a result (e.g., the result 52 of FIG. 1) of a previous execution of the one or more instructions 36(0) (block 76). If no entry corresponding to the one or more instructions 36(0) is identified within the quantum optimization database 46, operations in some examples may resume at block 78 of FIG. 2C. However, if it is determined at decision block 76 that the one or more instructions 36(0) corresponds to the entry 48(0), the optimization service 44 in some examples may further determine whether a computing device identifier of the entry 48(0) (e.g., the computing device identifier 58 of FIG. 1) corresponds to the computing device 12 (block 80). If not, operations in such examples may continue at block 78 of FIG. 2C. If the optimization service 44 in such examples determines at decision block 80 that the computing device identifier 58 of the entry 48(0) corresponds to the computing device 12, operations continue at block 82 of FIG. 2B.

Figure 2B:
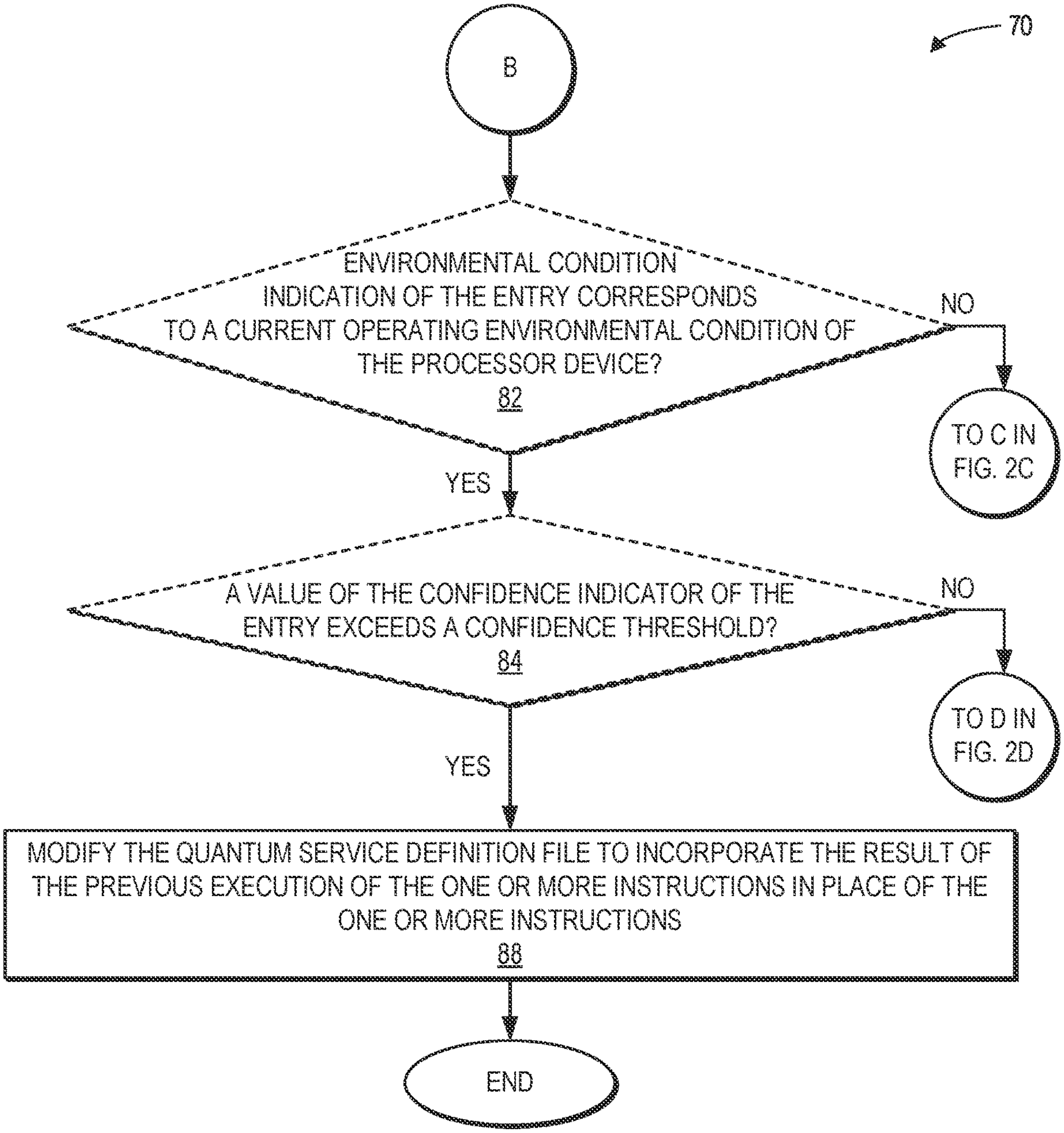

Referring now to FIG. 2B, the optimization service 44 according to some examples may determine whether an environmental condition indication of the entry 48(0) (e.g., the environmental condition indication 60 of FIG. 1) corresponds to a current operating environmental condition of the processor device 16 (block 82). If not, operations in such examples may continue at block 78 of FIG. 2C. However, if it is determined in such examples at decision block 82 that the environmental condition indication 60 of the entry 48(0) does correspond to a current operating environmental condition of the processor device 16, the optimization service 44 in some examples may determine whether a value of a confidence indicator of the entry 48(0) (e.g., the confidence indicator 62 of FIG. 1) exceeds a confidence threshold (such as the confidence threshold 64 of FIG. 1) (block 84). If not, operations in such examples may continue at block 86 of FIG. 2D.

If the optimization service 44 determines that the conditions of decision block 76 of FIG. 2A (and, in some examples, the conditions of decision block 80 of FIG. 2A and/or decision blocks 82 and/or 84 of FIG. 2B) are satisfied, the optimization service 44 modifies the quantum service definition file 34 to incorporate the result 52 of the previous execution of the one or more instructions 36(0) in place of the one or more instructions 36(0) (block 88). In this manner, the quantum service definition file 34 can be optimized by avoiding execution of the one or more instructions 36(0).

Figure 2C:
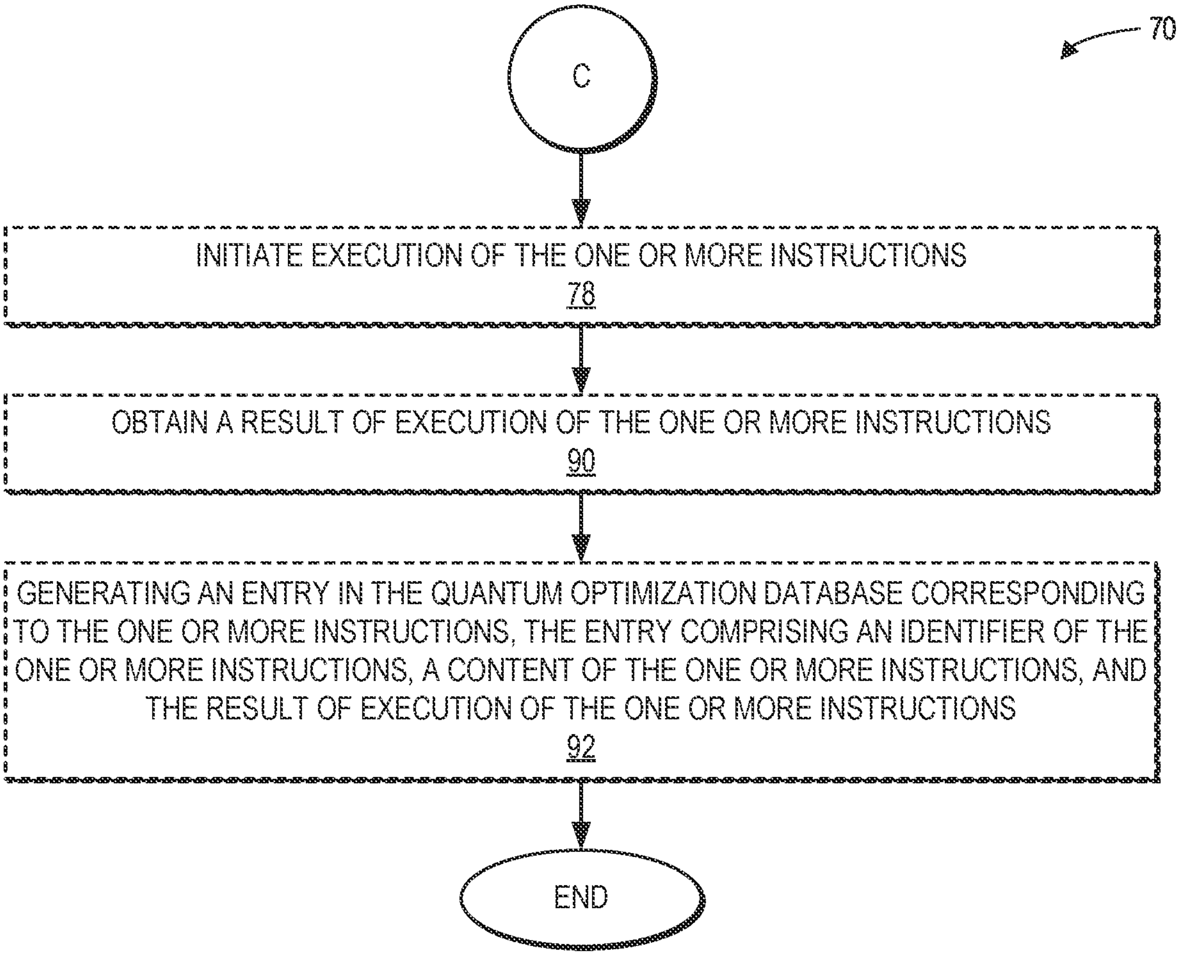

Turning now to FIG. 2C, if the optimization service 44 determines that the conditions of decision block 76 of FIG. 2A (and, according to some examples, the conditions of decision block 80 of FIG. 2A and/or decision block 82 of FIG. 2B) are not met, the optimization service 44 initiates execution of the one or more instructions 36(0) (block 78). The optimization service 44 next obtains a result of execution of the one or more instructions 36(0) (e.g., the result 68 of FIG. 1) (block 90). The optimization service 44 then generates an entry (e.g., the entry 48(0) of FIG. 1) corresponding to the one or more instructions 36(0), the entry 48(0) comprising an identifier of the one or more instructions 36(0) (e.g., the identifier 54 of FIG. 1), a content of the one or more instructions 36(0) (e.g., the content 56 of FIG. 1), and the result of execution of the one or more instructions 36(0) (e.g., the result 68 of FIG. 1 stored as the result 52) (block 92).

Figure 2D:
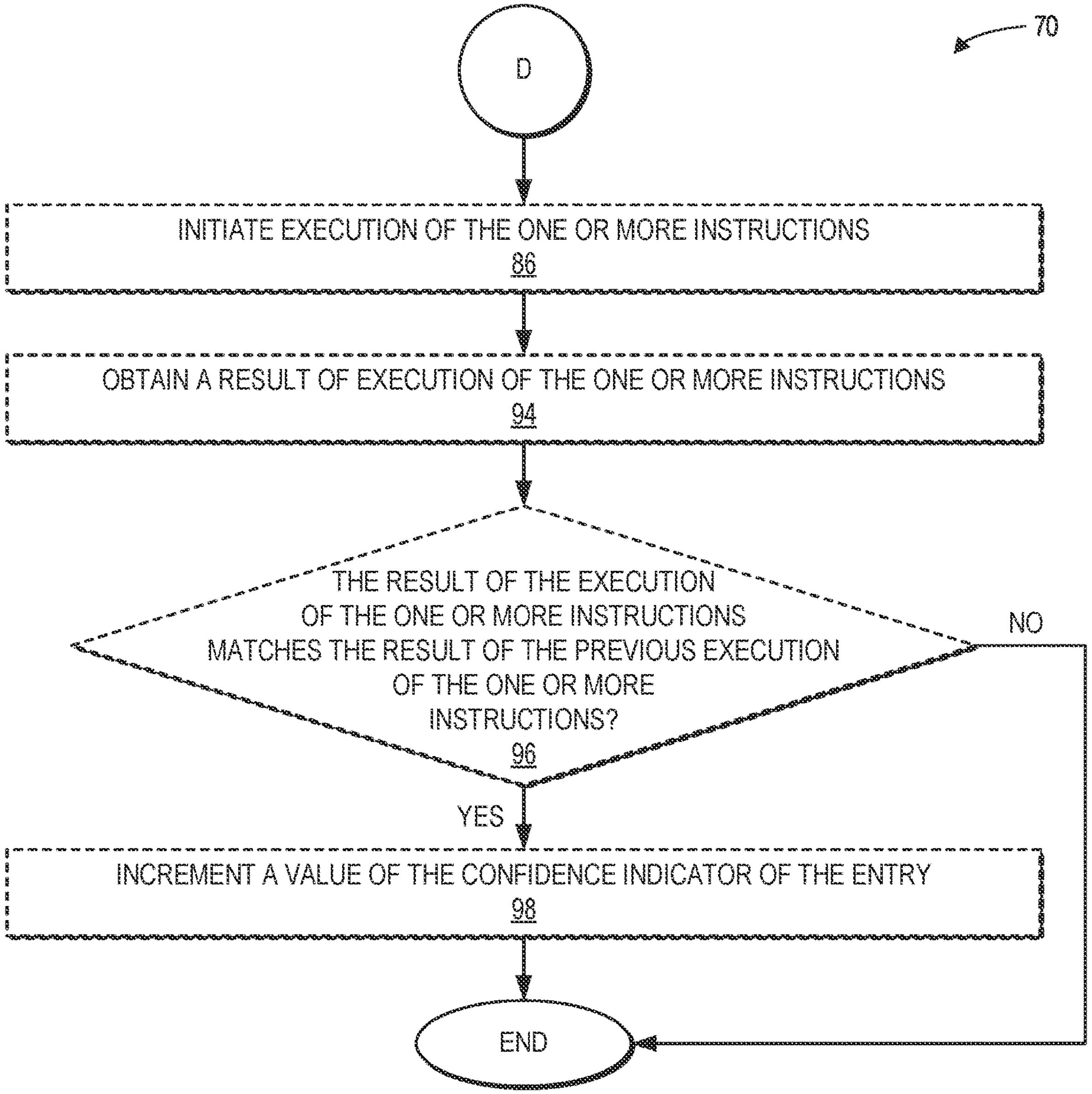

Referring now to FIG. 2D, if the optimization service 44 in some examples determines that the conditions of decision block 84 of FIG. 2B are not met, the optimization service 44 initiates execution of the one or more instructions 36(0) (block 86). The optimization service 44 next obtains a result of execution of the one or more instructions 36(0) (e.g., the result 66 of FIG. 1) (block 94). The optimization service 44 then determines whether the result 66 of the execution of the one or more instructions 36(0) matches the result 52 of the previous execution of the one or more instructions 36(0) (block 96). If so, the optimization service 44 in such examples increments a value of the confidence indicator 62 of the entry 48(0) (block 98). If the optimization service 44 determines at decision block 96 that the result 66 does not match the result 52, the optimization service 44 leaves the confidence indicator 62 unchanged.

Figure 3:
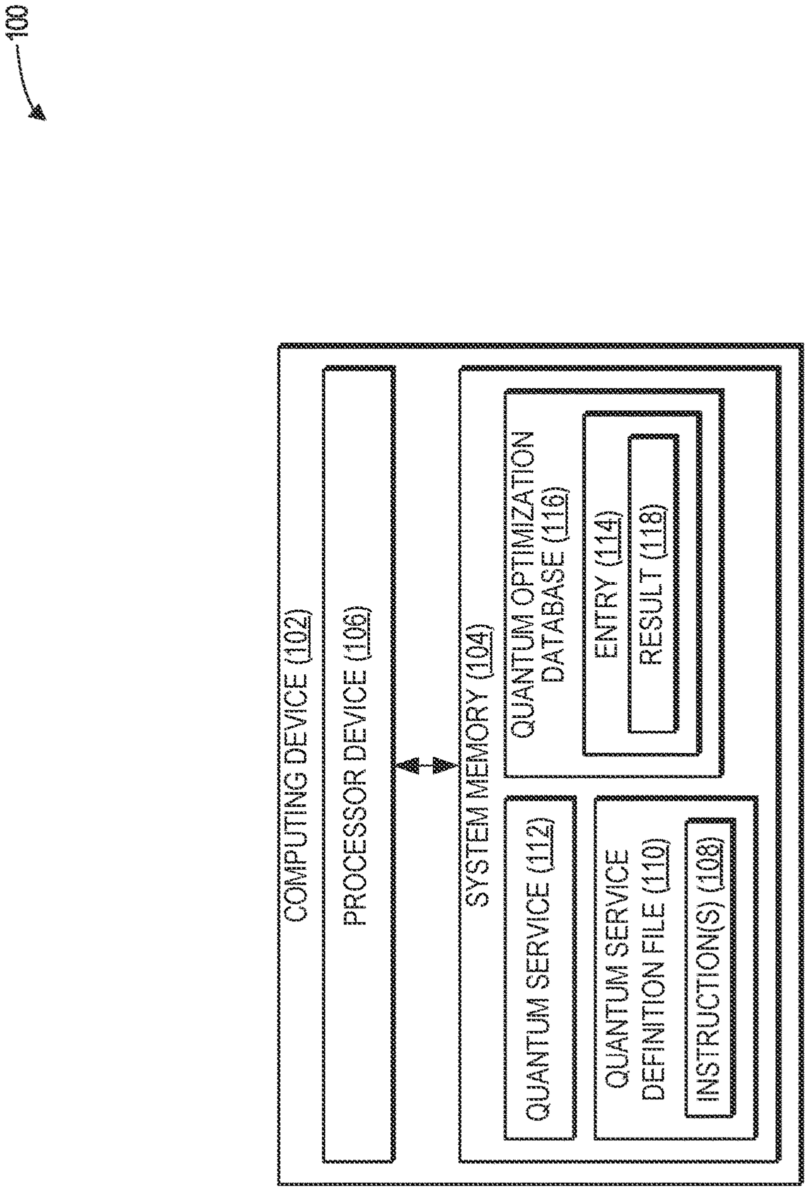
FIG. 3 is a simpler block diagram of the computing system of FIG. 1 for optimizing execution of quantum service definition files using a quantum optimization database, according to one example.

FIG. 3 is a simpler block diagram of the computing system 10 of FIG. 1 for optimizing execution of quantum service definition files using a quantum optimization database, according to one example. In the example of FIG. 3, a computing system 100 includes a computing device 102 (e.g., a classical computing device or a quantum computing device) that comprises a system memory 104 and a processor device 106. In exemplary operation, the processor device 106 identifies one or more instructions 108 within a quantum service definition file 110 of a quantum service 112. The processor device 106 next determines that the one or more instructions 108 corresponds to an entry 114 in a quantum optimization database 116, where the entry 114 stores a result 118 of a previous execution of the corresponding one or more instructions 108. The processor device 106 then modifies the quantum service definition file 110 to incorporate the result 118 of the previous execution of the one or more instructions 108 in place of the one or more instructions 108 within the quantum service definition file 110.

Figure 4:
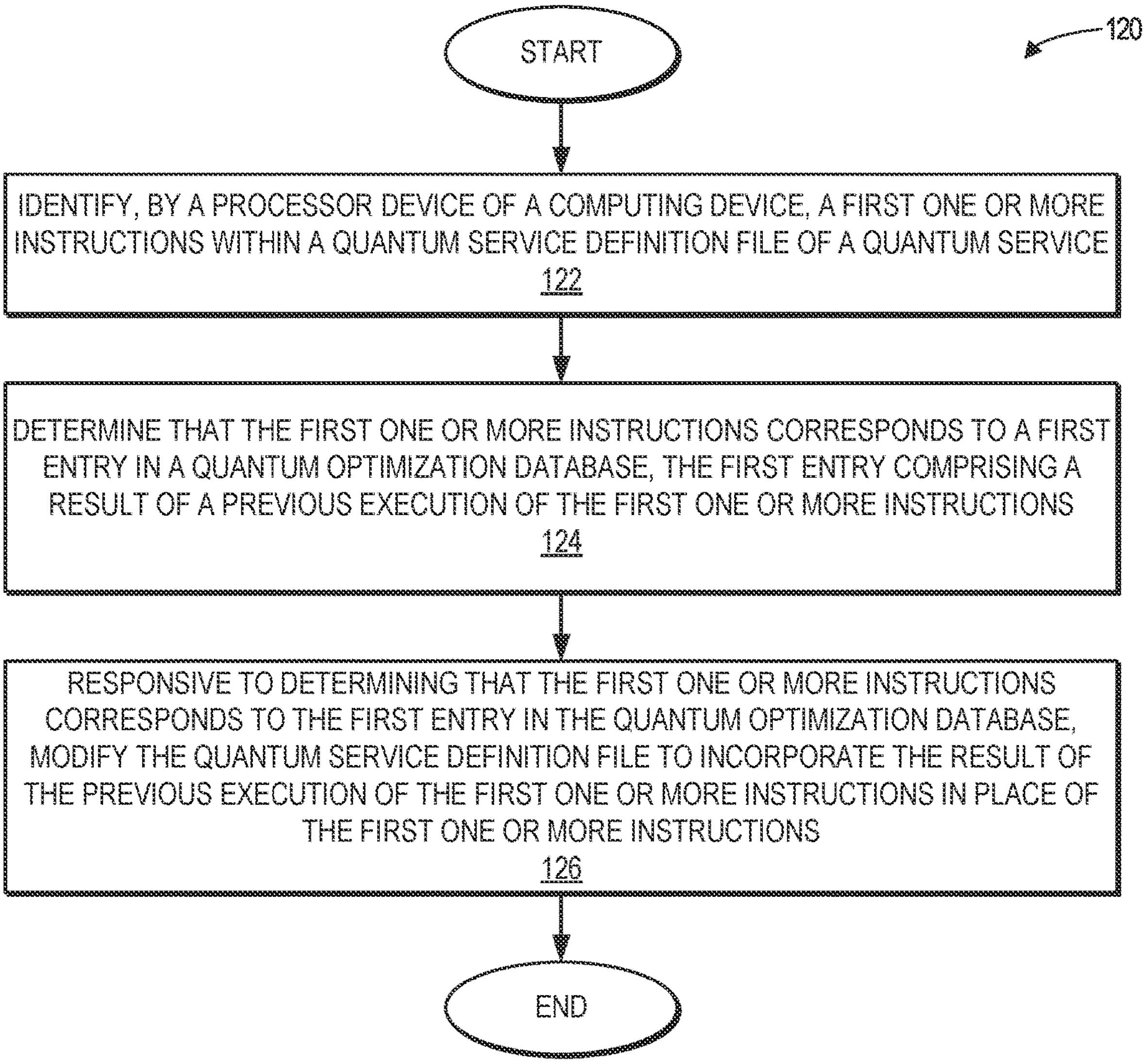
FIG. 4 is a flowchart of a simplified method for optimizing execution of quantum service definition files using a quantum optimization database by the quantum computing device of FIG. 3, according to one example.

To illustrate a simplified method for optimizing execution of quantum service definition files using a quantum optimization database in the computing system 100 of FIG. 3 according to one example, FIG. 4 provides a flowchart 120. Elements of FIG. 3 are referenced in describing FIG. 4 for the sake of clarity. In FIG. 4, operations begin with the processor device 106 of the computing device 102 identifying the one or more instructions 108 within the quantum service definition file 110 of the quantum service 112 (block 122). The processor device 106 next determines that the one or more instructions 108 corresponds to the entry 114 in the quantum optimization database 116, the entry 114 comprising the result 118 of a previous execution of the one or more instructions 108 (block 124). In response to determining that the one or more instructions 108 corresponds to the entry 114 in the quantum optimization database 116, the processor device 106 modifies the quantum service definition file 110 to incorporate the result 118 of the previous execution of the one or more instructions 108 in place of the one or more instructions 108 (block 126).

Figure 5:
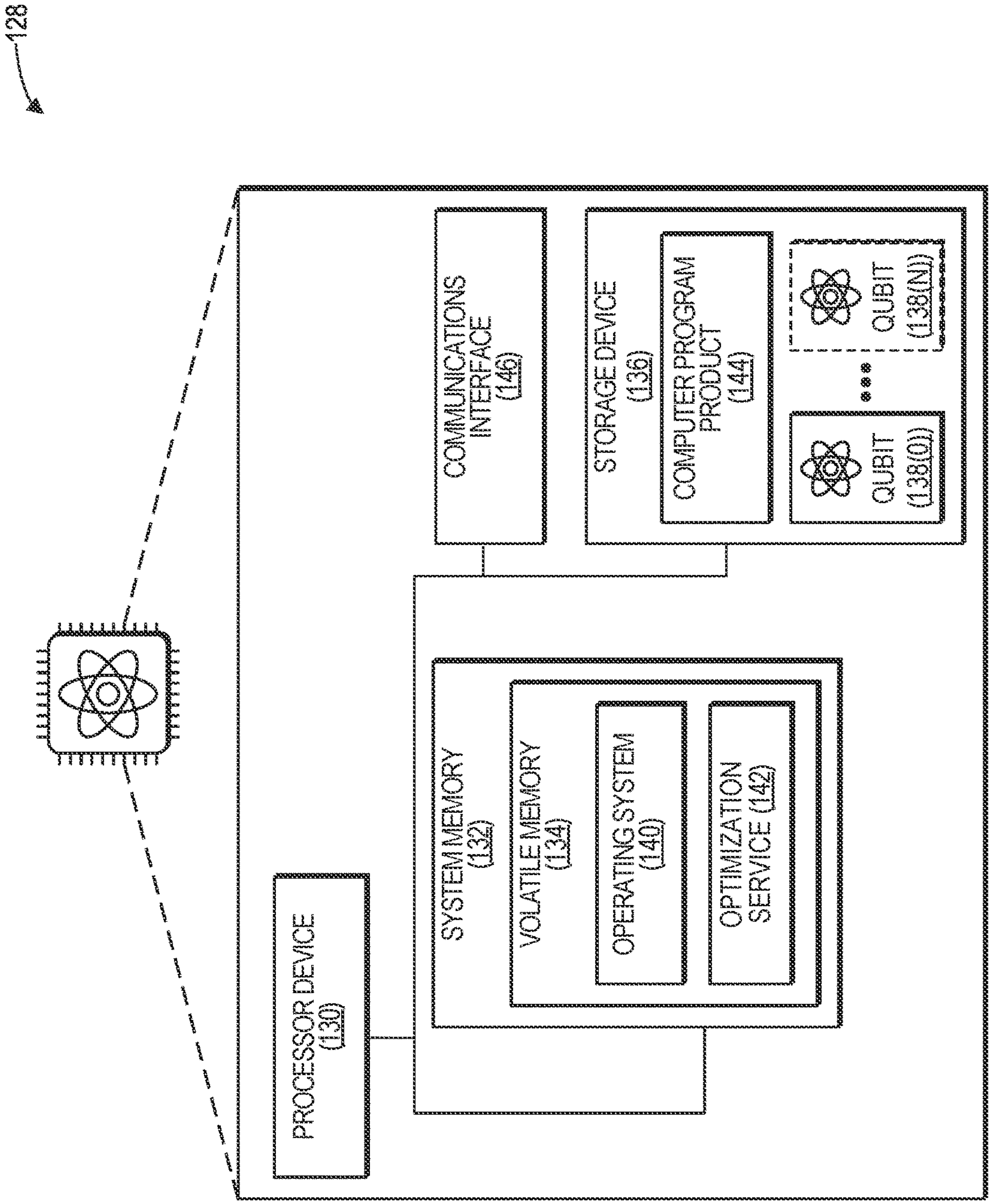
FIG. 5 is a block diagram of a quantum computing device suitable for implementing examples, according to one example.

FIG. 5 is a block diagram of a quantum computing device 128, such as the quantum computing device 18 of FIG. 1, suitable for implementing examples according to one example. The quantum computing device 128 may comprise any suitable quantum computing device or devices. The quantum computing device 128 can operate using classical computing principles or quantum computing principles. When using quantum computing principles, the quantum computing device 128 performs computations that utilize quantum-mechanical phenomena, such as superposition and entanglement. The quantum computing device 128 may operate under certain environmental conditions, such as at or near zero degrees (0°) Kelvin. When using classical computing principles, the quantum computing device 128 utilizes binary digits that have a value of either zero (0) or one (1).

The quantum computing device 128 includes a processor device 130 and a system memory 132. The processor device 130 can be any commercially available or proprietary processor suitable for operating in a quantum environment. The system memory 132 may include volatile memory 134 (e.g., random-access memory (RAM)). The quantum computing device 128 may further include or be coupled to a non-transitory computer-readable medium such as a storage device 136. The storage device 136 and other drives associated with computer-readable media and computer-usable media may provide non-volatile storage of data, data structures, computer-executable instructions, and the like. The storage device may also provide functionality for storing one or more qubits 138(0)-138(N).

A number of modules can be stored in the storage device 136 and in the volatile memory 134, including an operating system 140 and one or more modules, such as an optimization service 142. All or a portion of the examples may be implemented as a computer program product 144 stored on a transitory or non-transitory computer-usable or computer-readable medium, such as the storage device 136, which includes complex programming instructions, such as complex computer-readable program code, to cause the processor device 130 to carry out the steps described herein. Thus, the computer-readable program code can comprise computer-executable instructions for implementing the functionality of the examples described herein when executed on the processor device 130.

An operator may also be able to enter one or more configuration commands through a keyboard (not illustrated), a pointing device such as a mouse (not illustrated), or a touch-sensitive surface such as a display device (not illustrated). The quantum computing device 128 may also include a communications interface 146 suitable for communicating with other computing systems, including, in some implementations, classical computing devices.

Figure 6:
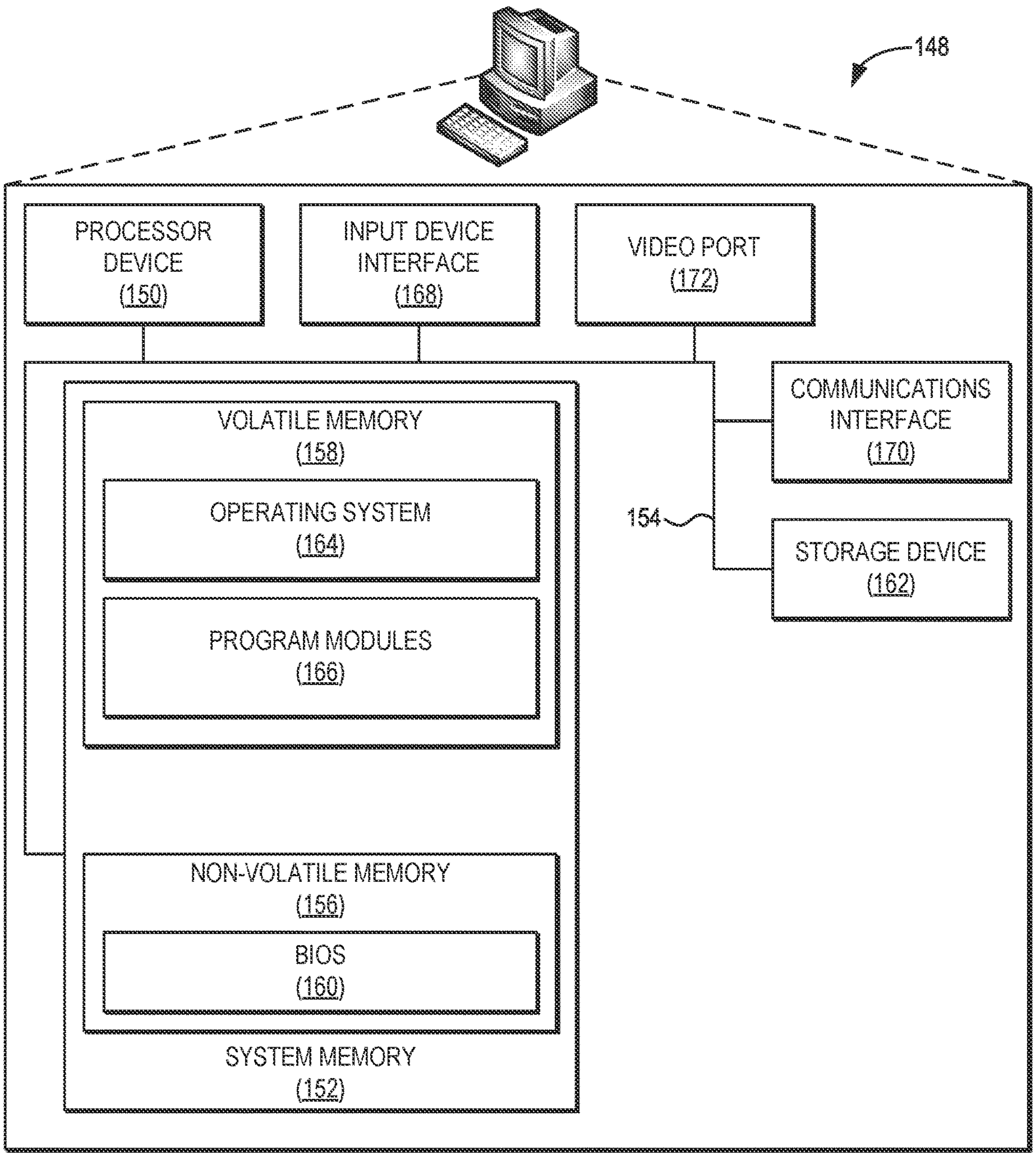
FIG. 6 is a block diagram of a classical computing device suitable for implementing examples, according to one example.

FIG. 6 is a block diagram of a processor-based computing device 148 ("computing device 148" or "classical computing device 148"), such as the classical computing device 12 of FIG. 1 in some examples, suitable for implementing examples according to one example. The computing device 148 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 148 includes a processor device 150, a system memory 152, and a system bus 154. The system bus 154 provides an interface for system components including, but not limited to, the system memory 152 and the processor device 150. The processor device 150 can be any commercially available or proprietary processor.

The system bus 154 may be any of several types of bus structures that may further interconnect to a memory bus (with or without a memory controller), a peripheral bus, and/or a local bus using any of a variety of commercially available bus architectures. The system memory 152 may include non-volatile memory 156 (e.g., read-only memory (ROM), erasable programmable ROM (EPROM), electrically EPROM (EEPROM), etc.), and volatile memory 158 (e.g., RAM). A basic input/output system (BIOS) 160 may be stored in the non-volatile memory 156 and can include the basic routines that help to transfer information among elements within the computing device 148. The volatile memory 158 may also include a high-speed RAM, such as static RAM, for caching data.

The computing device 148 may further include or be coupled to a non-transitory computer-readable storage medium such as a storage device 162, which may comprise, for example, an internal or external hard disk drive (HDD) (e.g., enhanced integrated drive electronics (EIDE) or serial advanced technology attachment (SATA)), for storage, flash memory, or the like. The storage device 162 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 162 and in the volatile memory 158, including an operating system 164 and one or more program modules 166 (e.g., the optimization service 44 of FIG. 1) which may implement the functionality described herein in whole or in part. It is to be appreciated that the examples can be implemented with various commercially available operating systems 164 or combinations of operating systems 164. All or a portion of the examples may be implemented as a computer program product stored on a transitory or non-transitory computer-usable or computer-readable storage medium, such as the storage device 162, which includes complex programming instructions, such as complex computer-readable program code, to cause the processor device 150 to carry out the steps described herein. Thus, the computer-readable program code can comprise software instructions for implementing the functionality of the examples described herein when executed on the processor device 150. The processor device 150 may serve as a controller, or control system, for the computing device 148 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 150 through an input device interface 168 that is coupled to the system bus 154 but can be connected by other interfaces, such as a parallel port, an Institute of Electrical and Electronic Engineers (IEEE) 1394 serial port, a Universal Serial Bus (USB) port, an IR interface, and the like.

The computing device 148 may also include a communications interface 170 suitable for communicating with a network as appropriate or desired. The computing device 148 may also include a video port 172 to interface with a display device to provide information to a user.

Individuals will recognize improvements and modifications to the preferred examples of the disclosure. All such improvements and modifications are considered within the scope of the concepts disclosed herein and the claims that follow.

What is claimed is:

1. A method, comprising:

identifying, during execution of a quantum service definition file of a quantum service, by a processor device of a computing device, a first one or more instructions within the quantum service definition file;

determining that the first one or more instructions correspond to a first entry in a quantum optimization database, the first entry comprising a result of a previous execution of the first one or more instructions, wherein the first entry further comprises an indication of an environmental condition under which the previous execution of the first one or more instructions was performed;

responsive to determining that the first one or more instructions correspond to the first entry in the quantum optimization database, determining that the environmental condition under which the previous execution of the first one or more instructions was performed corresponds to a current operating environmental condition of the processor device; and responsive to determining that the environmental condition under which the previous execution of the first one or more instructions was performed corresponds to the current operating environmental condition of the processor device, modifying, prior to execution of the first one or more instructions, the quantum service definition file to incorporate the result of the previous execution of the first one or more instructions in place of the first one or more instructions.

2. The method of claim 1, wherein:

the first entry further comprises a computing device identifier of a computing device on which the previous execution of the first one or more instructions was performed; and determining that the first one or more instructions correspond to the first entry comprises determining that the computing device identifier of the first entry corresponds to the computing device.

3. The method of claim 1, wherein:

the first entry further comprises a first confidence indicator;

the method further comprises determining that a value of the first confidence indicator of the first entry exceeds a confidence threshold; and modifying the quantum service definition file to incorporate the result of the previous execution of the first one or more instructions in place of the first one or more instructions is further responsive to determining that the value of the first confidence indicator of the first entry exceeds the confidence threshold.

4. The method of claim 3, further comprising:

identifying, by the processor device, a second one or more instructions within the quantum service definition file of the quantum service;

determining that the second one or more instructions correspond to a second entry in the quantum optimization database, the second entry comprising a result of a previous execution of the second one or more instructions and a second confidence indicator;

determining that a value of the second confidence indicator of the second entry does not exceed the confidence threshold; and responsive to determining that the value of the second confidence indicator of the second entry does not exceed the confidence threshold:

initiating execution of the second one or more instructions;

obtaining a result of the execution of the second one or more instructions;

determining that the result of the execution of the second one or more instructions matches the result of the previous execution of the second one or more instructions; and incrementing the value of the second confidence indicator of the second entry.

5. The method of claim 4, further comprising:

identifying, by the processor device of the computing device, a third one or more instructions within the quantum service definition file of the quantum service;

determining that the third one or more instructions does not correspond to any entry in the quantum optimization database; and responsive to determining that the third one or more instructions does not correspond to any entry in the quantum optimization database:

initiating execution of the third one or more instructions;

obtaining a result of execution of the third one or more instructions; and generating a third entry in the quantum optimization database corresponding to the third one or more instructions, the third entry comprising an identifier of the third one or more instructions, a content of the third one or more instructions, and the result of the execution of the third one or more instructions.

6. The method of claim 5, wherein the third entry further comprises one or more of an identifier of the computing device, an indication of an environmental condition under which the execution of the third one or more instructions was performed, and a third confidence indicator.

7. The method of claim 1, wherein the environmental condition under which the previous execution of the first one or more instructions was performed comprises a quantum environmental condition, and wherein the current operating environmental condition of the processor device comprises a current quantum operating environmental condition.

8. A computing device, comprising:

a system memory; and a processor device communicatively coupled to the system memory, the processor device to:

identify, during execution of a quantum service definition file of a quantum service, a first one or more instructions within the quantum service definition file;

determine that the first one or more instructions correspond to a first entry in a quantum optimization database, the first entry comprising a result of a previous execution of the first one or more instructions, wherein the first entry further comprises an indication of an environmental condition under which the previous execution of the first one or more instructions was performed;

responsive to determining that the first one or more instructions correspond to the first entry in the quantum optimization database, determine that the environmental condition under which the previous execution of the first one or more instructions was performed corresponds to a current operating environmental condition of the processor device; and responsive to determining that the environmental condition under which the previous execution of the first one or more instructions was performed corresponds to the current operating environmental condition of the processor device, modify, prior to execution of the first one or more instructions, the quantum service definition file to incorporate the result of the previous execution of the first one or more instructions in place of the first one or more instructions.

9. The computing device of claim 8, wherein:

the first entry further comprises a computing device identifier of a computing device on which the previous execution of the first one or more instructions was performed; and to determine that the first one or more instructions correspond to the first entry is to determine that the computing device identifier of the first entry corresponds to the computing device.

10. The computing device of claim 8, wherein:

the first entry further comprises a first confidence indicator;

the processor device is further to determine that a value of the first confidence indicator of the first entry exceeds a confidence threshold; and to modify the quantum service definition file to incorporate the result of the previous execution of the first one or more instructions in place of the first one or more instructions, the processor device is to modify the quantum service definition file further responsive to determining that the value of the first confidence indicator of the first entry exceeds the confidence threshold.

11. The computing device of claim 10, wherein the processor device is further to:

identify a second one or more instructions within the quantum service definition file of the quantum service;

determine that the second one or more instructions correspond to a second entry in the quantum optimization database, the second entry comprising a result of a previous execution of the second one or more instructions and a second confidence indicator;

determine that a value of the second confidence indicator of the second entry does not exceed the confidence threshold; and responsive to determining that the value of the second confidence indicator of the second entry does not exceed the confidence threshold:

initiate execution of the second one or more instructions;

obtain a result of the execution of the second one or more instructions;

determine that the result of the execution of the second one or more instructions matches the result of the previous execution of the second one or more instructions; and increment the value of the second confidence indicator of the second entry.

12. The computing device of claim 11, wherein the processor device is further to:

identify a third one or more instructions within the quantum service definition file of the quantum service;

determine that the third one or more instructions does not correspond to any entry in the quantum optimization database; and responsive to determining that the third one or more instructions does not correspond to any entry in the quantum optimization database:

initiate execution of the third one or more instructions;

obtain a result of the execution of the third one or more instructions; and generate a third entry in the quantum optimization database corresponding to the third one or more instructions, the third entry comprising an identifier of the third one or more instructions, a content of the third one or more instructions, and the result of the execution of the third one or more instructions.

13. The computing device of claim 12, wherein the third entry further comprises one or more of an identifier of the computing device, an indication of an environmental condition under which the execution of the third one or more instructions was performed, and a third confidence indicator.

14. A non-transitory computer-readable medium having stored thereon computer-executable instructions that, when executed, cause one or more processor devices of a quantum computing device to:

identify, during execution of a quantum service definition file of a quantum service, a first one or more instructions within the quantum service definition file;

determine that the first one or more instructions correspond to a first entry in a quantum optimization database, the first entry comprising a result of a previous execution of the first one or more instructions, wherein the first entry further comprises an indication of an environmental condition under which the previous execution of the first one or more instructions was performed;

responsive to determining that the first one or more instructions correspond to the first entry in the quantum optimization database, determine that the environmental condition under which the previous execution of the first one or more instructions was performed corresponds to a current operating environmental condition of the processor device; and responsive to determining that the environmental condition under which the previous execution of the first one or more instructions was performed corresponds to the current operating environmental condition of the processor device, modify, prior to execution of the first one or more instructions, the quantum service definition file to incorporate the result of the previous execution of the first one or more instructions in place of the first one or more instructions.

15. The non-transitory computer-readable medium of claim 14, wherein:

the first entry further comprises a first confidence indicator;

the computer-executable instructions further cause the one or more processor devices to determine that a value of the first confidence indicator of the first entry exceeds a confidence threshold; and to modify the quantum service definition file to incorporate the result of the previous execution of the first one or more instructions in place of the first one or more instructions, the instructions further cause the one or more processor devices to modify the quantum service definition file further responsive to determining that the value of the first confidence indicator of the first entry exceeds the confidence threshold.

16. The non-transitory computer-readable medium of claim 15, wherein the computer-executable instructions further cause the one or more processor devices to:

identify a second one or more instructions within the quantum service definition file of the quantum service;

determine that the second one or more instructions correspond to a second entry in the quantum optimization database, the second entry comprising a result of a previous execution of the second one or more instructions and a second confidence indicator;

determine that a value of the second confidence indicator of the second entry does not exceed the confidence threshold; and responsive to determining that the value of the second confidence indicator of the second entry does not exceed the confidence threshold:

initiate execution of the second one or more instructions;

obtain a result of the execution of the second one or more instructions;

determine that the result of the execution of the second one or more instructions matches the result of the previous execution of the second one or more instructions; and increment the value of the second confidence indicator of the second entry.

17. The non-transitory computer-readable medium of claim 16, wherein the computer-executable instructions further cause the one or more processor devices to:

identify a third one or more instructions within the quantum service definition file of the quantum service;

determine that the third one or more instructions does not correspond to any entry in the quantum optimization database; and responsive to determining that the third one or more instructions does not correspond to any entry in the quantum optimization database:

initiate execution of the third one or more instructions;

obtain a result of the execution of the third one or more instructions; and generate a third entry in the quantum optimization database corresponding to the third one or more instructions, the third entry comprising an identifier of the third one or more instructions, a content of the third one or more instructions, and the result of the execution of the third one or more instructions.

* * * * *